United States Patent Office 3,470,186

Patented Sept. 30, 1969

1

3,470,186

SUBSTITUTED 4-ANILINO-3-QUINOLINE-CARBOXYLIC ACIDS AND ESTERS

John William Hanifin, Jr., Suffern, N.Y., Rosemary Angela Capuzzi, Cliffside Park, N.J., and Eliott Cohen, Pearl River, N.Y., assignors to American Cyanamid Company, Stamford, Conn., a corporation of Maine No Drawing. Filed June 2, 1967, Ser. No. 643,034

Int. Cl. C07d *33/52, 33/48;* A61k *27/00*

U.S. Cl. 260—287 10 Claims

ABSTRACT OF THE DISCLOSURE

This disclosure describes compounds of the class of substituted 4-anilino-3-quinolinecarboxylic acids and esters useful as diuretic and anti-depressant agents.

Brief summary of the invention

This invention relates to novel substituted 4-anilino-3-quinolinecarboxylic acids and esters and, more particularly, is concerned with novel compounds which may be represented by the following general formula:

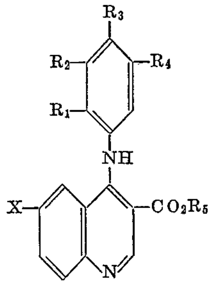

wherein X is hydrogen or halogen; $R_1$ is hydrogen or halogen; $R_2$ and $R_4$ are each hydrogen, trifluoromethyl or lower alkoxy; $R_3$ is hydrogen, halogen or lower alkoxy; and $R_5$ is hydrogen or lower alkyl; with the proviso that $R_1$, $R_2$, $R_3$ and $R_4$ may not all be hydrogen. Suitable lower alkyl and lower alkoxy groups contemplated by the present invention are those having up to about 4 carbon atoms such as methyl, ethyl, isopropyl, n-butyl, methoxy, ethoxy, n-propoxy, isobutoxy, etc. Halogen is exemplified by chloro, bromo and iodo.

Detailed description of the invention

The novel substituted 4-anilino-3-quinolinecarboxylic acids and esters of the present invention are, in general, white to yellow crystalline solids having characteristic absorption spectra and rather high melting points. The free bases of these novel compounds are of limited solubility in water, rather more soluble in lower alkanols, and relatively insoluble in light organic solvents such as toluene, benzene, diethyl ether, and the like. The anionic, cationic and quaternary ammonium salts of these novel compounds are soluble in polar solvents such as water and lower alkanols. The infrared and ultraviolet absorption spectra are characteristic of the novel compounds of the present invention and provide a preferred means of distinguishing and identifying them.

The present invention also embraces the useful non-toxic pharmaceutically acceptable acid-addition (anionic) salts and quaternary ammonium salts of these novel compounds. Thus, acid-addition salts, formed by admixture of the organic free base with an acid, suitably in a neu-

2 tral solvent, are formed with such acids as sulfuric, phosphoric, hydrochloric, hydrobromic, sulfamic, citric, lactic, malic, succinic, tartaric, acetic, benzoic, gluconic, ascorbic, and related acids. Quaternary ammonium salts may be formed by reaction of the free bases with a variety of organic esters of sulfuric, hydrohalic, and aromatic sulfonic acids. The organic reagents employed for quaternary ammonium salt formation are preferably lower alkyl halides. However, other organic reagents are suitable for such salt formation, and may be selected from among a diverse class of compounds including benzyl chloride, phenethyl chloride, naphthylmethyl chloride, dimethyl sulfate, methyl benzenesulfonate, ethyl toluenesulfonate, allyl chloride, methallyl bromide and crotyl bromide. Acid-addition salt formation takes place at the 4-position nitrogen atom whereas quaternary ammonium salt formation takes place at the nitrogen atom of the pyridine ring. For purposes of this invention the free bases are equivalent to their non-toxic acid-addition (anionic) and quaternary ammonium salts.

Also embraced within the scope of the present invention are the non-toxic pharmaceutically acceptable cationic salts of these novel compounds when $R_5$ is hydrogen in the above general formula. The cations comprised in these salts include, for example, the non-toxic metal cations such as the sodium ion, potassium ion, calcium ion, magnesium ion, as well as the organic amine cations such as the tri(lower alkyl)amine cations (e.g., triethylamine), procaine, and the like. For purposes of this invention the free bases are equivalent to their non-toxic cationic salts. The novel compounds of the present invention are physiologically active and therefore useful in the pharamaceutical field. In particular, the compounds of this invention are useful because they possess diuretic and natriuretic properties. They differ from most of the known effective diuretic agents, however, in that the compounds of this invention greatly enhance the excretion of sodium ions with a slight increase in excretion of potassium ions. The potassium loss, which is caused by known diuretics, often results in a severe muscular weakness. Since the compounds of this invention are essentially free of this potassium depletion effect, they have this decided advantage as diuretics. As diuretic agents, they can be used for the treatment of edema, hypertension and other diseases known to be responsive to this therapy.

The novel compounds of the present invention were shown to possess diuretic properties as determined by animal experiments as follows. Four cages (two rats per cage) of mature male rats weighing between 180 and 300 grams were allowed a normal fluid intake prior to testing. The single oral administration of 400 micrograms of the test compound was given in 0.5 ml. of 2% aqueous starch suspension. Four cages (two rats per cage) served as controls for each measurement. Control animals received only the starch suspension. After administration, the test animals were placed in metabolism cages. Observations of the amount of urine excreted were made after 5 hours and after 24 hours. These urine measurements were then adjusted to compensate for differing weights of individual animals. The final values recorded were the ratios of the amount of urine excreted by the test rats to the amount of urine excreted by the control rats. Sodium and potassium concentrations in the urine were determined by flame photometry, and chloride concentrations were measured by mercurimetric titration.

The novel compounds of the present invention are valuable diuretic agents of low toxicity and may be administered either orally or parenterally. When so administered, they have been found to exhibit diuretic action in amounts ranging from about 20 to about 250 milligrams per kilogram of body weight per day, preferably in subdivided amounts on a 2 to 4 times a day regimen. In addition, the novel compounds of the present invention are valuable anti-depressants and have been found to exhibit such activity in amounts ranging from about 10 to about 200 milligrams per kilogram of body weight per day, again preferably in subdivided amounts on a 2 to 4 times a day regimen.

The novel compounds of the present invention may be administered as active components of compositions for administration in unit dosage form as tablets, pills, capsules, powders, granules, sterile parenteral solutions or suspensions, oral solutions or suspensions and the like. For preparing solid compositions such as tablets, the principal active ingredient is mixed with conventional tableting ingredients such as corn starch, lactose, sucrose, sorbitol, talc, stearic acid, magnesium stearate, dicalcium phosphate, gums, and functionally similar materials as pharmaceutical diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate, and the like. A particularly advantageous enteric coating comprises a styrene maleic acid copolymer together with known materials contributing to the enteric properties of the coating.

The liquid forms in which the novel compounds of the present invention may be incorporated for administration include aqueous solutions, suitably flavored syrups, aqueous or oil suspensions, flavored emulsions with edible oils such as cottonseed oil, sesame oil, coconut oil, peanut oil, and the like, as well as elixirs and similar pharmaceutical vehicles. Suitable dispersing or suspending agents for aqueous suspensions include synthetic and natural gums such as tragacanth, acacia, alginic acid, dextran, sodium carboxymethylcellulose, methylcellulose, polyvinylpyrrolidone, gelatin and the like. Sterile suspensions or solutions are required for parenteral use. Isotonic preparations containing suitable preservatives are also highly desirable for parenteral use.

The term unit dosage form refers to physically discrete units suitable as unitary dosages, each unit containing a predetermined quantity of active material calculated to produce the desired therapeutic effect in association with the required pharmaceutical diluent, carrier or vehicle. The specifications for the unit dosage forms of this invention are dictated by and are directly dependent on (a) the unique characteristic of the active material and the particular therapeutic effect to be achieved, and (b) the limitations inherent in the art of compounding such an active material for therapeutic use, as disclosed in detail in this specification, these being features of the present invention. Examples of suitable oral unit dosage forms in accord with this invention are tablets, capsules, pills, powders, packets, granules, wafers, caches teaspoonfuls, dropperfuls, ampules, vials, segregated multiples of any of the foregoing and other forms as herein described.

The novel compounds of the present invention may be readily prepared by interacting an appropriately substituted 4-chloro-3-quinolinecarboxylic acid ester with an appropriately substituted aniline in accordance with the following reaction scheme:

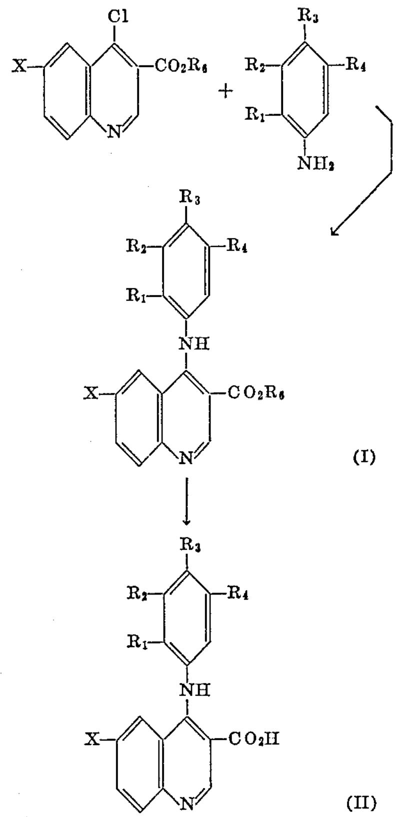

wherein X, $R_1$, $R_2$, $R_3$ and $R_4$ are as hereinabove defined and $R_6$ is a lower alkyl group of from 1 to 4 carbon atoms. The reaction of the appropriately substituted 4-chloro-3-quinolinecarboxylic acid ester with the appropriately susbtituted aniline may be carried out by heating the two reactants together on a steam bath for from about 10 to about 30 minutes, or by heating in an inert solvent, preferably toluene, for from about 30 to about 60 minutes. Isolation of the product is achieved by conventional means well known to those skilled in the art. The hydrolysis of the resulting substituted 4-anilino-3-quinolinecarboxylic acid ester (I) to the corresponding substituted 4-anilino-3-quinolinecarboxylic acid (II) is carried out by heating the ester in a 5% aqueous or ethanolic sodium hydroxide solution for from about 30 to about 60 minutes. Again, isolation of the product is achieved by conventional means well known to those skilled in the art.

The invention will be described in greater detail in conjunction with the following specific examples.

EXAMPLE 1

Preparation of ethyl 4,6-dichloro-3-quinolinecarboxylate

A mixture of 28.2 g. (0.18 mole) of phosphorous oxychloride and 27.0 g. (0.11 mole) of ethyl 6-chloro-4-hydroxy-3-quinolinecarboxylate was heated on the steam bath for one hour. This was allowed to cool and poured onto 400 ml. of ice to which had been added about 80 ml. of concentrated ammonia water. The mass was stirred and kept cold until it became entirely granular. It was then extracted with three 500 ml. portions of ether. After drying over magnesium sulfate, the ether was removed and the residue was crystallized from petroleum benzoin (B.P. 40° C.–60° C.), yielding 20.3 g. (70%) M.P. 76° C.–77° C.;

$$\lambda_{max.}^{KBr}\ 5.80 \text{ and } 6.32\mu$$

EXAMPLE 2

Preparation of ethyl 6-chloro-4-(α,α,α-trifluoro-m-toluidino)-3-quinolinecarboxylate To 1.0 g. (0.004 mole) of ethyl 4,6-dichloro-3-quinolinecarboxylate was added 0.89 g. (0.006 mole) of m-aminobenzotrifluoride. The solution was heated on the steam bath for ten minutes and then left to stand for one-half hour. The mixture solidified on standing. Dissolution of this in water and basification with ammonia yielded the product which crystallized from ethanol to give 1.05 g. (71.9%) of yellow crystals, M.P. 144° C.–147° C.;

$$\lambda_{max.}^{KBr} \text{ 5.98 and 6.25}\mu$$

EXAMPLE 3

Preparation of ethyl 4-(α,α,α-trifluoro-m-toluidino)-3-quinolinecarboxylate 1.0 g. (0.004 mole) of ethyl 4-chloro-3-quinolinecarboxylate was reacted with 1.0 g. (0.006 mole) of m-aminobenzotrifluoride according to Example 2 to give the product, M.P. 105° C.

EXAMPLE 4

Preparation of ethyl 4-(4-chloro-α,α,α-trifluoro-m-toluidino)-3-quinolinecarboxylate 0.5 g. (0.002 mole) of ethyl 4-chloro-3-quinolinecarboxylate was reacted with 0.6 g. (0.003 mole) of melted 5-amino-2-chlorobenzotrifluoride according to Example 2 to give the product, M.P. 144° C.

EXAMPLE 5

Preparation of ethyl 4-(6-chloro-α,α,α-trifluoro-m-toluidino)-3-quinolinecarboxylate 1.5 g. (0.006 mole) of ethyl 4-chloro-3-quinolinecarboxylate was reacted with 1.8 g. (0.010 mole) of 3-amino-4-chlorobenzotrifluoride according to Example 2 to give the product, M.P. 157° C.

EXAMPLE 6

Preparation of ethyl 4-anilino-6-chloro-3-quinolinecarboxylate 1.5 g. (0.006 mole) of ethyl 4,6-dichloro-3-quinolinecarboxylate was reacted with 0.77 g. (0.008 mole) of aniline according to Example 2 to give the product, M.P. 134° C.

EXAMPLE 7

Preparation of ethyl 6-chloro-4-(4-chloro-α,α,α-trifluoro-m-toluidino)-3-quinolinecarboxylate 1.0 g. (0.004 mole) of ethyl 4,6-dichloro-3-quinolinecarboxylate was reacted with 1.1 g. (0.006 mole) of melted 5-amino-2-chlorobenzotrifluoride according to Example 2 to give the product, M.P. 145° C.

EXAMPLE 8

Preparation of ethyl 6-chloro-4-(6-chloro-α,α,α-trifluoro-m-toluidino)-3-quinolinecarboxylate 1.6 g. (0.006 mole) of ethyl 4,6-dichloro-3-quinolinecarboxylate was reacted with 2.0 g. (0.01 mole) of 3-amino-4-chlorobenzotrifluoride according to Example 2 to give the product, M.P. 192° C.

EXAMPLE 9

Preparation of ethyl 4-p-anisidino-6-chloro-3-quinolinecarboxylate 1.0 g. (0.004 mole) of ethyl 4,6-dichloro-3-quinolinecarboxylate was reacted with 1.0 g. (0.006 mole) of melted p-anisidine according to Example 2 to give the product, M.P. 132° C.

EXAMPLE 10

Preparation of ethyl 4-m-anisidino-6-chloro-3-quinolinecarboxylate 1.0 g. (0.004 mole) of ethyl 4,6-dichloro-3-quinolinecarboxylate was reacted with 1.0 g. (0.008 mole) of m-anisidine in 25 ml. of toluene according to Example 2 to give the product, M.P. 120° C.

EXAMPLE 11

Preparation of ethyl 6-chloro-4-(3,4,5-trimethoxyanilino)-3-quinolinecarboxylate 1.0 g. (0.004 mole) of ethyl 4,6-dichloro-3-quinolinecarboxylate was reacted with 1.0 g. (0.006 mole) of 3,4,5-trimethoxyaniline in 25 ml. of toluene according to Example 2 to give the product, M.P. 190° C.

EXAMPLE 12

Preparation of 6-chloro-4-(α,α,α-trifluoro-m-toluidino)-3-quinolinecarboxylic acid To 20 ml. of 5% sodium hydroxide in ethanol was added 1.0 g. (0.0025 mole) of ethyl 6-chloro-4-(α,α,α-trifluoro-m-toluidino)-3-quinolinecarboxylate. After hydrolyzing for one hour, hydrogen chloride gas was bubbled through until the solution was strongly acidic, pH=1. Sodium acetate was then added, slowly bringing the solution to pH=3. Upon filtering, the yellow precipitate was washed with ethanol and water. The precipitate was then heated in water and the solution was adjusted to pH=5. After washing with water, the product was dried in vacuo to give 0.78 g. (83%) of yellow crystals. An analytical sample was prepared by crystallizing 150 mg. from methanol, M.P. 268° C.–272° C.;

$$\lambda_{max.}^{KBr} \text{ 6.02 and 6.30}\mu$$

The U.V. spectrum of the material showed $\lambda_{max.}^{CH_3OH}$ 230 mμ (ε 37,800), 257 mμ (ε 16,500), and 355 mμ (ε 8,800)

EXAMPLE 13

Preparation of 4-(α,α,α-trifluoro-m-toluidino)-3-quinolinecarboxylic acid 1.0 g. (0.003 mole) of ethyl 4-(α,α,α-trifluoro-m-toluidino)-3-quinolinecarboxylate was hydrolyzed for one hour in 10 ml. of 5% sodium hydroxide in ethanol according to Example 12 to yield the product, M.P. 270° C.

EXAMPLE 14

Preparation of 4-(4-chloro-α,α,α-trifluoro-m-toluidino)-3-quinolinecarboxylic acid 1.5 g. (0.003 mole) of ethyl 4-(4-chloro-α,α,α-trifluoro-m-toluidino)-3-quinolinecarboxylate was hydrolyzed for one hour in 20 ml. of 5% sodium hydroxide in ethanol according to Example 12 to yield the product, M.P. 266° C.

EXAMPLE 15

Preparation of 4-(6-chloro-α,α,α-trifluoro-m-toluidino)-3-quinolinecarboxylic acid 1.0 g. (0.0025 mole) of ethyl 4-(6-chloro-α,α,α-trifluoro-m-toluidino)-3-quinolinecarboxylate was hydrolyzed for one hour in 15 ml. of 5% sodium hydroxide in ethanol according to Example 12 to yield the product, M.P. 283° C.

EXAMPLE 16

Preparation of 6-chloro-4-(4-chloro-α,α,α-trifluoro-m-toluidino)-3-quinolinecarboxylic acid 1.0 g. (0.002 mole) of ethyl 4-(4-chloro-α,α,α-trifluoro-m-toluidino)-6-chloro-3-quinolinecarboxylate was hydrolyzed for one hour in 20 ml. of 5% sodium hydroxide in ethanol according to Example 12 to yield the product, M.P. 267° C.

EXAMPLE 17

Preparation of 6-chloro-4-(6-chloro-α,α,α-trifluoro-m-toluidino)-3-quinolinecarboxylic acid 1.5 g. (0.0035 mole) of ethyl 4-(6-chloro-α,α,α-trifluoro - m-toluidino)-6-chloro-3-quinolinecarboxylate was hydrolyzed for one hour in 40 ml. of 5% sodium hydroxide in ethanol according to Example 12 to yield the product, M.P. 279° C.

EXAMPLE 18

Preparation of 4-p-anisidino-6-chloro-3-quinolinecarboxylic acid 1.2 g. (0.003 mole) of ethyl 4-(p-anisidino)-6-chloro-3-quinolinecarboxylate was hydrolyzed for one hour in 20 ml. of 5% sodium hydroxide in ethanol according to Example 12 to yield the product, M.P. 265° C.

What is claimed is:

1. A compound selected from the group consisting of those of the formula:

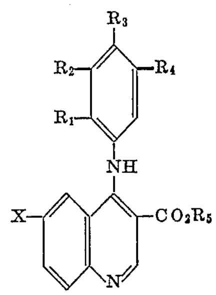

wherein X is selected from the group consisting of hydrogen and halogen, $R_1$ is selected from the group consisting of hydrogen and halogen, $R_2$ is selected from the group consisting of hydrogen, trifluoromethyl and lower alkoxy, $R_3$ is selected from the group consisting of hydrogen, halogen and lower alkoxy, $R_4$ is selected from the group consisting of hydrogen, trifluoromethyl and lower alkoxy, and $R_5$ is selected from the group consisting of hydrogen and lower alkyl with the proviso that $R_1$, $R_2$, $R_3$ and $R_4$ cannot all be hydrogen; the non-toxic pharmaceutically acceptable acid-addition and quaternary ammonium salts thereof; and the cationic salts thereof when $R_5$ is hydrogen.

2. A compound according to claim 1 wherein X is chloro; $R_1$, $R_2$ and $R_4$ are hydrogen; $R_3$ is methoxy; and $R_5$ is ethyl.

3. A compound according to claim 1 wherein X is chloro; $R_1$, $R_2$, $R_4$ and $R_5$ are hydrogen; and $R_3$ is methoxy.

4. A compound according to claim 1 wherein X is chloro; $R_1$ is hydrogen; $R_2$, $R_3$ and $R_4$ are methoxy; and $R_5$ is ethyl.

5. A compound according to claim 1 wherein X is chloro; $R_1$, $R_2$ and $R_3$ are hydrogen; $R_4$ is methoxy; and $R_5$ is ethyl.

6. A compound according to claim 1 wherein X and $R_1$ are chloro; $R_2$ and $R_3$ are hydrogen; $R_4$ is trifluoromethyl; and $R_5$ is ethyl.

7. A compound according to claim 1 wherein X is chloro; $R_1$, $R_2$, $R_3$ and $R_5$ are hydrogen; and $R_4$ is trifluoromethyl.

8. A compound according to claim 1 wherein X and $R_3$ are chloro; $R_1$ and $R_2$ are hydrogen; $R_4$ is trifluoromethyl; and $R_5$ is ethyl.

9. A compound according to claim 1 wherein X, $R_2$ $R_3$, and $R_5$ are hydrogen; $R_1$ is chloro; and $R_4$ is trifluoromethyl.

10. A compound according to claim 1 wherein X, $R_1$, $R_2$, $R_3$ and $R_5$ are hydrogen; and $R_4$ is trifluoromethyl.

References Cited

UNITED STATES PATENTS

| | | | |
|---|---|---|---|
| 2,419,199 | 4/1947 | Burckhalter et al. | 260—287 X |
| 2,883,382 | 4/1959 | Elslager | 260—288 |

OTHER REFERENCES

Sen et al.: Abstracted in Chem. Abstr., vol. 64, col. 14164 (1965).

Kermack et al.: Abstracted in Chem. Abstr., vol. 46, col. 2066–7 (1952).

ALEX MAZEL, Primary Examiner

D. G. DAUS, Assistant Examiner

U.S. Cl. X.R.

260—286, 472, 578; 424—258